(12) United States Patent
Chen et al.

(10) Patent No.: US 6,912,106 B1
(45) Date of Patent: Jun. 28, 2005

(54) WRITER WITH A HOT SEED ZERO THROAT AND SUBSTANTIALLY FLAT TOP POLE

(75) Inventors: Yingjian Chen, Fremont, CA (US); Qing He, Fremont, CA (US); Yugang Wang, Milpitas, CA (US); Kroum Stoev, Fremont, CA (US); Francis Liu, Fremont, CA (US); Xiaozhong Dang, Fremont, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 200 days.

(21) Appl. No.: 10/213,532

(22) Filed: Aug. 6, 2002

(51) Int. Cl.[7] .............................................. G11B 5/147
(52) U.S. Cl. ...................................................... 360/126
(58) Field of Search ................................. 360/125, 126, 360/121; 29/603.1

(56) References Cited

U.S. PATENT DOCUMENTS 5,901,432 A * 5/1999 Armstrong et al. ...... 29/603.14
6,282,056 B1 * 8/2001 Feng et al. ................. 360/126

* cited by examiner

*Primary Examiner*—Allen Cao
(74) *Attorney, Agent, or Firm*—Joshua C. Harrison, Esq.; Sawyer Law Group (57) ABSTRACT

A method and system for providing a recording head is disclosed. The method and system include providing a first pole, a second pole, a write gap and at least one coil. The write cap separates the first pole from the second pole. The coil(s) include a plurality of turns and is between the first and second poles. The first pole includes a pedestal that has a first portion and a second portion. The first portion includes a high moment electroplated material. The second portion includes a hot seed layer that has a high moment sputtered material. The second portion of the first pole is adjacent to the write gap.

24 Claims, 7 Drawing Sheets

WRITER WITH A HOT SEED ZERO THROAT AND SUBSTANTIALLY FLAT TOP POLE

FIELD OF THE INVENTION

The present invention relates to magnetic recording systems, and more particularly to a method and system for providing a write head that has a hot seed defined zero-throat position.

BACKGROUND OF THE INVENTION

Figure 1:
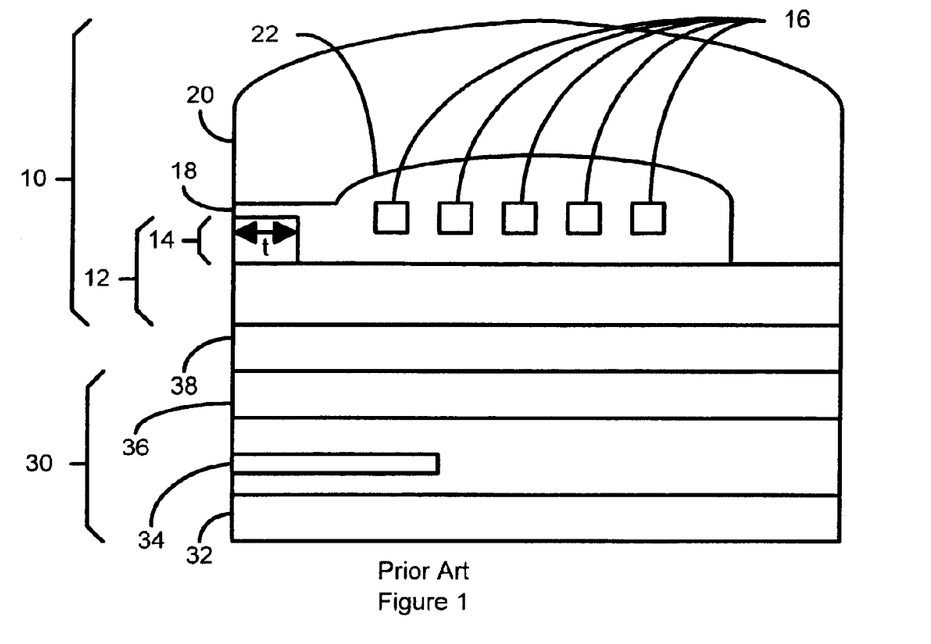
FIG. 1 is a side view of a portion of a conventional merged head including a recording head and a read head.

In order to write data to media, a write head is typically used. Such a write head is generally part of a merged head that includes a head for writing and a head for reading data from the media. FIG. 1 depicts a side view of a portion of a merged head including a conventional recording head 10 and a conventional read head 30. The conventional recording head 10 includes a conventional first pole (P1) 12 and a conventional second pole (P2) 20 that are separated at the front, near the air-bearing surface, by a conventional write gap 18. Also shown is the hardbake photoresist layer 22 that is typically photoresist that is used to insulate the coils 16 of the conventional write head 10. The conventional P1 12 includes a conventional pedestal 14. The conventional read head 30 includes first shield (S1) 32, read sensor 34 and second shield 36. The conventional P1 12 typically lies above S2 and is separated from S2 by a gap 38.

Although the conventional recording head 10 functions, one of ordinary skill in the art will readily recognize that the conventional recording head 10 has a number of drawbacks. These drawbacks particularly impact recording at high areal densities. The conventional pedestal 14 is typically electroplated. In order to fabricate the conventional pedestal 14, a magnetic material is plated, then planarized typically using a chemical mechanical polish (CMP). As a result, for a conventional pedestal 14 having a thickness of approximately three microns, four microns of magnetic material are plated. Furthermore, it is typically desirable for a pedestal to have a relatively short throat height. The throat height is the distance at which the poles begin to diverge from the write gap 18. In the conventional recording head 10, the throat height is given by the width, t, of the conventional pedestal 14. A smaller throat height is desirable to concentrate magnetic flux in the area of the write gap 14. Thus, a smaller throat height for the conventional pedestal 14 is desired because the efficiency of writing would improve. However, the large thickness of material that is electroplated makes it difficult to reduce the throat height. In addition, if the throat height of the conventional pedestal 14 is too small, the conventional pedestal 14 may saturate. As a result, the conventional recording head 10 may experience side erasure, thereby inadvertently writing to adjacent tracks.

In addition, the conventional poles 12 and 20 are subject to pole tip protrusion. The conventional pedestal 14 and the conventional P2 20 have a coefficient thermal expansion that is widely different from the coefficient of thermal expansion of the write gap 18 and the hardbake photoresist layer 22. During operation, the conventional recording head 22 may experience heating. As a result, different portions of the conventional recording head 10 expand different amounts, causing the write head 10 to distort. The P1 12 and P2 20, as well as the hard baked photoresist 22, have large positive coefficients of thermal expansion. As result, the tips of P1 12 and P2 20 near the air-bearing surface expand and protrude outward. Moreover, the currents in the conventional write head 10 cause greater local heating in the region of the poles, exacerbating the protrusion of the poles P1 12 and P2 20.

The topography of the conventional recording head 10 also makes fabrication of the P2 20 problematic. Because of the structures fabricated under the P2 20, the surface on which the P2 20 is to be fabricated is not flat. Variations in the topography underlying the P2 20 can cause reflections during photolithography. As a result, the control of the track width of P2 20 (the dimension of P2 20 perpendicular to the page in FIG. 1), suffers.

Accordingly, what is needed is a system and method for providing an improved recording head. The present invention addresses such a need.

SUMMARY OF THE INVENTION

The present invention provides a method and system for providing a recording head. The method and system comprise providing a first pole, a second pole, a write gap and at least one coil. The write gap separates the first pole from the second pole. The coil(s) include a plurality of turns and is between the first and second poles. The first pole includes a pedestal that has a first portion and a second portion. The first portion includes a high moment electroplated material. The second portion includes a hot seed layer that has a high moment sputtered material. The second portion of the first pole is also adjacent to the write gap.

According to the system and method disclosed herein, the present invention provides a recording head capable of being used for higher density recording.

DETAILED DESCRIPTION OF THE INVENTION

The present invention relates to an improvement in magnetic recording heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a recording head. The method and system comprise providing a first pole, a second pole, a write gap and at least one coil. The write gap separates the first pole from the second pole. The coil(s) include a plurality of turns and is between the first and second poles. The first pole includes a pedestal that has a first portion and a second portion. The first portion includes a high moment electroplated material. The second portion includes a hot seed layer that has a high moment sputtered material. The second portion of the first pole is also adjacent to the write gap.

The present invention will be described in terms of a particular recording head. However, one of ordinary skill in the art will readily recognize that the method and system will operate effectively for other heads not inconsistent with the present invention. One of ordinary skill in the art will also readily recognize that the present invention is typically results in a recording head that is incorporated into a merged head having a recording head and a read head. The present invention is also described in the context of particular methods having certain steps. However, one of ordinary skill in the art will readily recognize that the present invention will operate effectively for other methods having different and/or additional steps.

Figure 2:
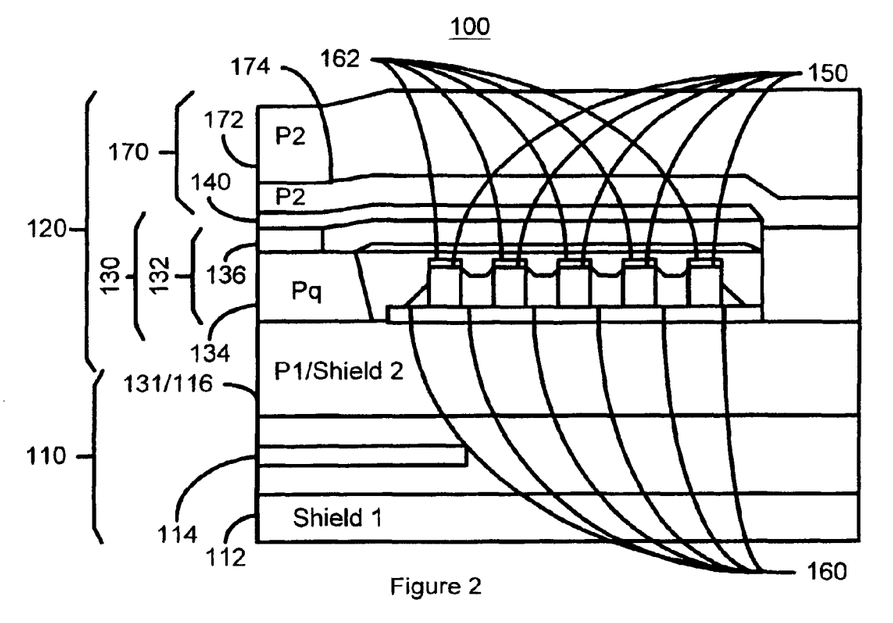
FIG. 2 is a diagram depicting one embodiment of a head in accordance in the present invention.
Figure 3:
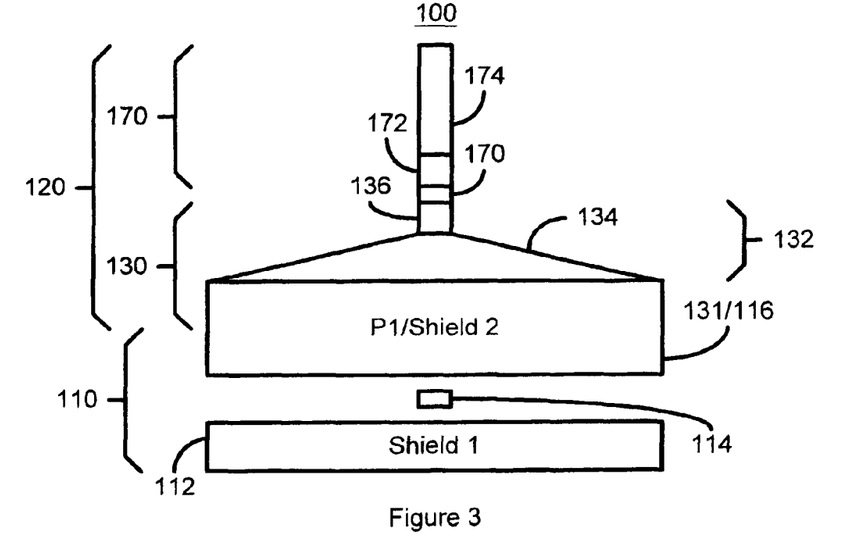
FIG. 3 is a diagram depicting one embodiment of a head in accordance with the present invention as viewed from the air bearing surface.
Figure 4:
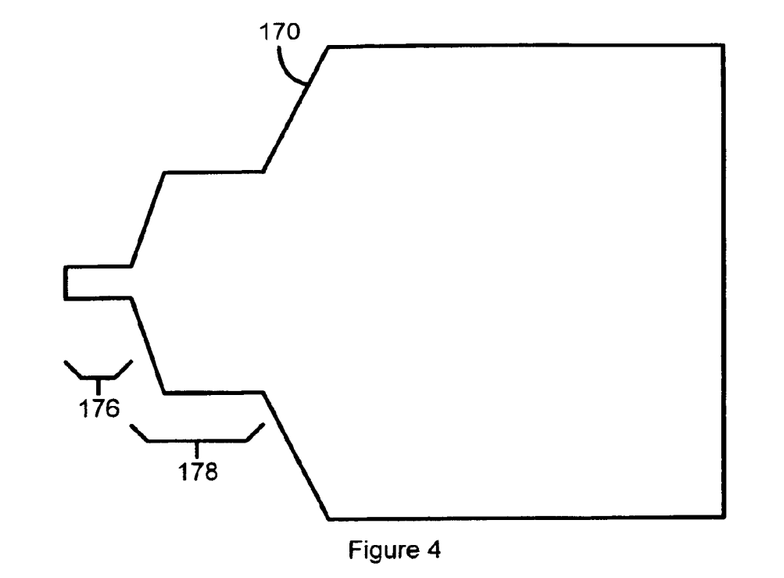
FIG. 4 is a diagram depicting one embodiment of a head in accordance with the present invention as viewed from above.

To more particularly illustrate the method and system in accordance with the present invention, refer now to FIG. 2, depicting a preferred embodiment of a head 100 in accordance in the present invention. FIG. 3 is a diagram depicting the preferred embodiment of the head 100 in accordance with the present invention as viewed from the air bearing surface. FIG. 4 is a diagram depicting the preferred embodiment of the top pole of the head 100 in accordance with the present invention as viewed from above. Referring to FIGS. 2, 3 and 4, the head 100 includes a read head 110 and a recording head 120. The read head 110 includes a first shield 112, a read sensor 114 and a second shield 116. The second shield 116 also serves as part of the first pole (P1) 130 for the recording head 120. The recording head 120 includes P1 130, a write gap 140, a coil 150 and a second pole (P2) 170. The coil(s) 150 are preferably insulated using a thin photoresist 160 that is cured. However, in an alternate embodiment, another type of insulation may be used. In a preferred embodiment, the coil 150 has between one and ten turns. Also note that although a single layer for the coil 150 is preferred, in another embodiment, multiple layers of coils can be used.

The P1 130 includes a bottom portion 131 and a pedestal 132. The pedestal 132 includes two parts 134 and 136. The first part 134 includes an electroplated high moment material and is preferably sloped. The second, top portion 136 of the pedestal 132 includes a sputtered high saturation moment material, termed a hot seed material. The hot seed materials include CoFeN or FeXN where X includes Rh, Al, Ta, Zr, Ti or like materials. The top portion 136 preferably defines the zero throat position for the recording head 120.

The P2 140 preferably has a substantially flat profile because the P2 140 is fabricated on a substantially planar surface. However, in an alternate embodiment, the P2 140 need not have a substantially flat profile. In addition to being substantially flat, the P2 140 preferably has a portion 172 formed using a sputtered hot seed material. The P2 140 also has a portion 174 that is electroplated. In addition, as shown in FIG. 4, the P2 140 preferably has a double nose design, including noses 176 and 178. In addition, although the P2 140, and P1 130, are shown as monolithic, the poles 130 and/or 140 could have a laminated structure. A laminated structure includes alternating layers of high moment and low moment material. In addition, the poles 130 and/or 140 could be formed using an amorphous magnetic allow, which has a higher resistivity, or be laminated using a dielectric for one or more of the alternating layers. In such a case, the head 100 would have less eddy currents and, therefore, a faster response.

Because they are separately fabricated, the bottom portion 134 and top portion 136 of the pedestal 132 for the P1 130 can be independently tailored. Consequently, the top portion 136 can be fabricated for a shorter throat, which concentrates flux in the region of the write gap 140. As a result, efficiency is improved while the side writing is reduced. Furthermore, the bottom portion 134 of the pedestal 132 can be slightly recessed from the air-bearing surface in order to achieve less side erasure. The use of hot seed materials in P2 170 also improves overwrite. The bottom portion 136 of the pedestal 132 for the P1 130 is sloped, containing more magnetic material near the bottom, so that the P1 130 does not saturate. The P2 140 is also substantially flat. As a result, advanced photolithography, such as deep ultraviolet (DUV) can be used to control the critical dimensions of the P2 140. Consequently, smaller features can be fabricated on the P2 140. For example, a narrow track width and short yoke length can be achieved for higher areal density and a higher data rate. The photoresist 160 insulating the turns of the coil 150 is also thin. The smaller volume of photoresist used allows the head 100 to be subject to less pole tip protrusion and, therefore, have improved reliability. In order to ensure that the coil 150 is adequately insulated, an additional layer of insulation 162 may optionally be provided.

Figure 5:
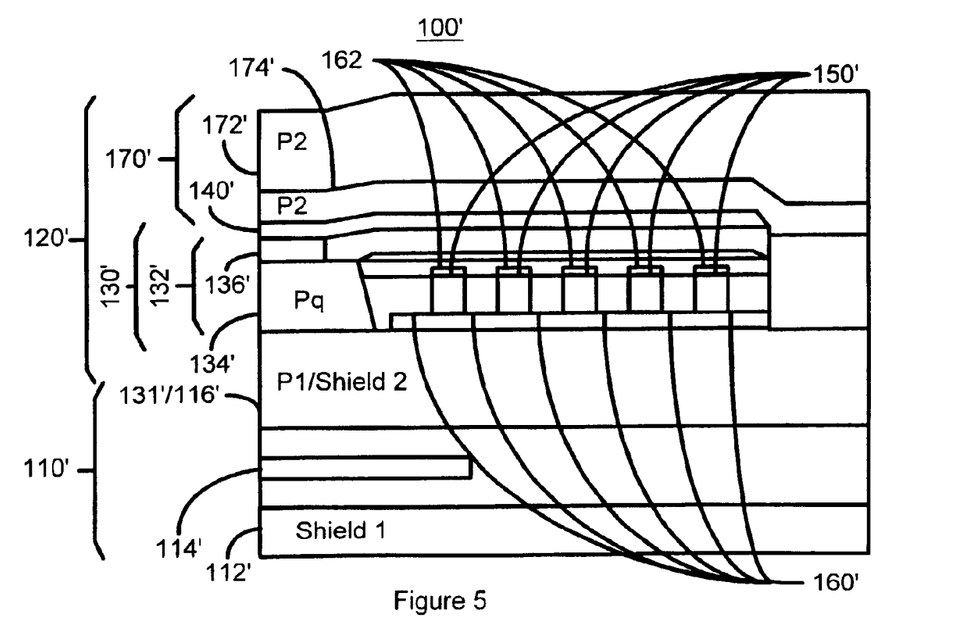
FIG. 5 is a diagram depicting a second embodiment of a head in accordance in the present invention.

FIG. 5 is a diagram depicting a second embodiment of a head 100' in accordance in the present invention. The head 100' preferably has substantially the same features as the head 100 depicted in FIGS. 2, 3, and 4. Consequently, the components of the head 100' are labeled similarly to the components of the head 100. However, the coil 150' of the head 100' is formed using a damascene process. In such a process, described below, the coil 150' is formed in trenches created in the insulating layer 160'. Thus, the coil is insulated using an insulating layer 160' such as $SiO_2$, rather than photoresist. The head 100' should still share many or all of the same benefits as the head 10. For example, efficiency, side writing, overwrite and side erasure may be improved for the head 100'. The head 100' may be less likely to saturate and can have a substantially flat P2 140'. Thus, the head 100' may have a narrow track with, as well as a short yoke length. In addition, the head 100' is preferably less subject to pole tip protrusion.

Figure 6:
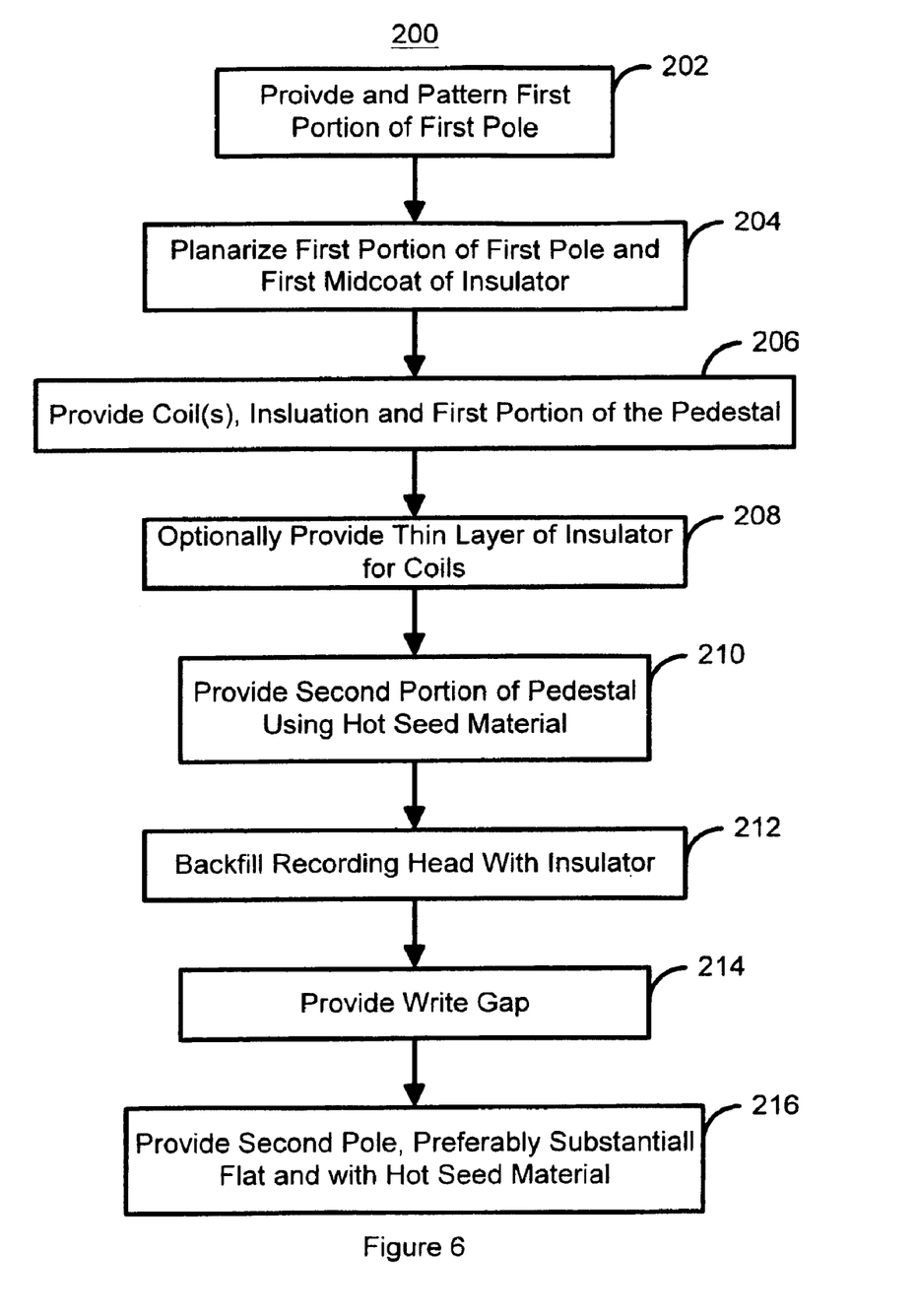
FIG. 6 is a high-level flow chart of one embodiment of a method in accordance with the present invention for providing a head in accordance with the present invention.

FIG. 6 is a high-level flow chart of one embodiment of a method 200 in accordance with the present invention for providing a head in accordance with the present invention. The method 200 is preferably used in forming the heads 100 and 100'. However, for clarity, the method 200 is described in the context of the head 100. The method 200 preferably commences after formation of the read head 110 up to the second shield 116. The bottom portion 131 of the P1 130 is provided and patterned to the desired shape, via step 202. The bottom portion 131 is preferably electroplated. The bottom portion 131 of the P1 130 and the S2 116 are planarized together with a first midcoat of insulator on which the coil 150 is fabricated, via step 204. The coil 150 and the first portion 134 of the pedestal 132 are provided, via step 206. Preferably, step 206 includes plating the coil 150 using a conductive material and plating the first portion 134 of the pedestal 132 using a high moment magnetic material. Step 206 also includes providing insulation for the coil 150. In step 206, a chemical mechanical polish ("CMP") process may also be used to planarize the pedestal 130 along with a second midcoat layer of insulation. The thin layer of insulator 162 is optionally provided, via step 208. The thin insulator 162 is used to help insulate the coil 150 from the P2 170. The second portion 136 of the pedestal 132 is provided by sputtering the hot seed material, via step 210. Also in step 210, the hot seed material 136 is also ion milled to the desired shape. The recording head 120 is back filled with an insulator, preferably alumina, via step 212. Thus, the portion of the recording head 120 behind the pedestal 132 is filled. The write gap 140 is provided, via step 214. The write gap 140 is preferably a nonmagnetic metal or a dielectric. The P2 170 is provided, via step 216. Step 216 preferably includes providing the hot seed material 172 as well as the top portion 174 of the P2 170.

Using the method 200 the head 100 and/or 100' can be fabricated. Consequently, a head that is efficient, has improved side writing, side erasure and overwrite and which has a narrow track width, a short yoke length and is less subject to pole tip protrusion can be fabricated.

Figure 7:
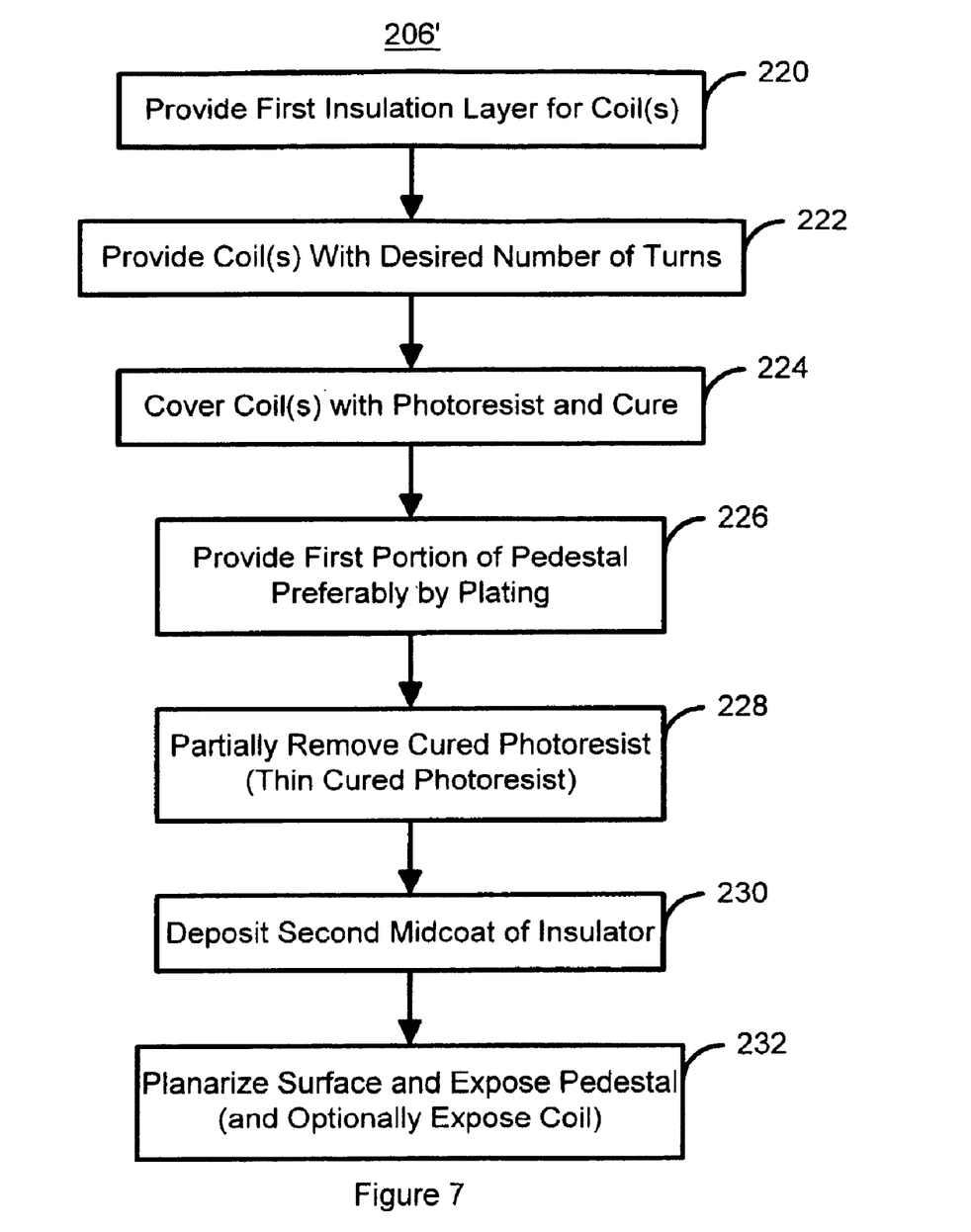
FIG. 7 is a more detailed flow chart of one embodiment of a method in accordance with the present invention for providing the coil for a head in accordance with the present invention.

FIG. 7 is a more detailed flow chart of one embodiment of a method 206' in accordance with the present invention for providing the coil for a head 100 in accordance with the present invention. The method 206' is preferably used for performing the step 206 in the method 200 when the head 100 is being fabricated. Thus, the method 206' is used for providing the coil 150 when thin photoresist that has been cured is used to insulate the turns of the coil 150. The method 206 also provides the bottom portion 134 of the pedestal 1132 for the P1 130. The first insulation underlying the coil 150 is deposited, via step 220. The coil 150 is provided, via step 222. Step 222 includes plating the material for the coil 150 and patterning the turns of the coil 150. The photoresist for the thin cured photoresist 162 is provided and cured, via step 224. The photoresist provided in step 224 covers the coil 150. The bottom portion 134 of the pedestal 132 is provided using negative photoresist and plating, via step 226. Step 226 includes providing photoresist having an aperture where the bottom portion 134 of the pedestal 132 is to reside and plating high moment material at the aperture. A portion of the resist provided in step 224 is preferably removed to thin the resist, via step 228. In a preferred embodiment, step 228 thins the resist 162 using oxygen reactive ion etching. Thus, the resist 162 insulating the turns of the coil 150 is thinner than for a conventional coil. As a result, the head 100 will be less subject to pole tip protrusion. A second mid coat of insulation is provided, via step 230. The midcoat of insulation is provided on the portion 134 of the pedestal 132 as well as on the resist 160. The mid coat of insulation is planarized and the bottom portion 134 of the pedestal 132 is exposed, via step 232. Step 232 is preferably performed using a chemical mechanical polish (CMP). The remainder of the method 200, preferably starting at step 208, can be performed. Thus, the bottom portion 134 of the pedestal 134 is exposed so that the hot seed material of the top portion 136 of the pedestal 132 can be formed. In addition, the P2 170 that is substantially flat can be formed.

Figure 8:
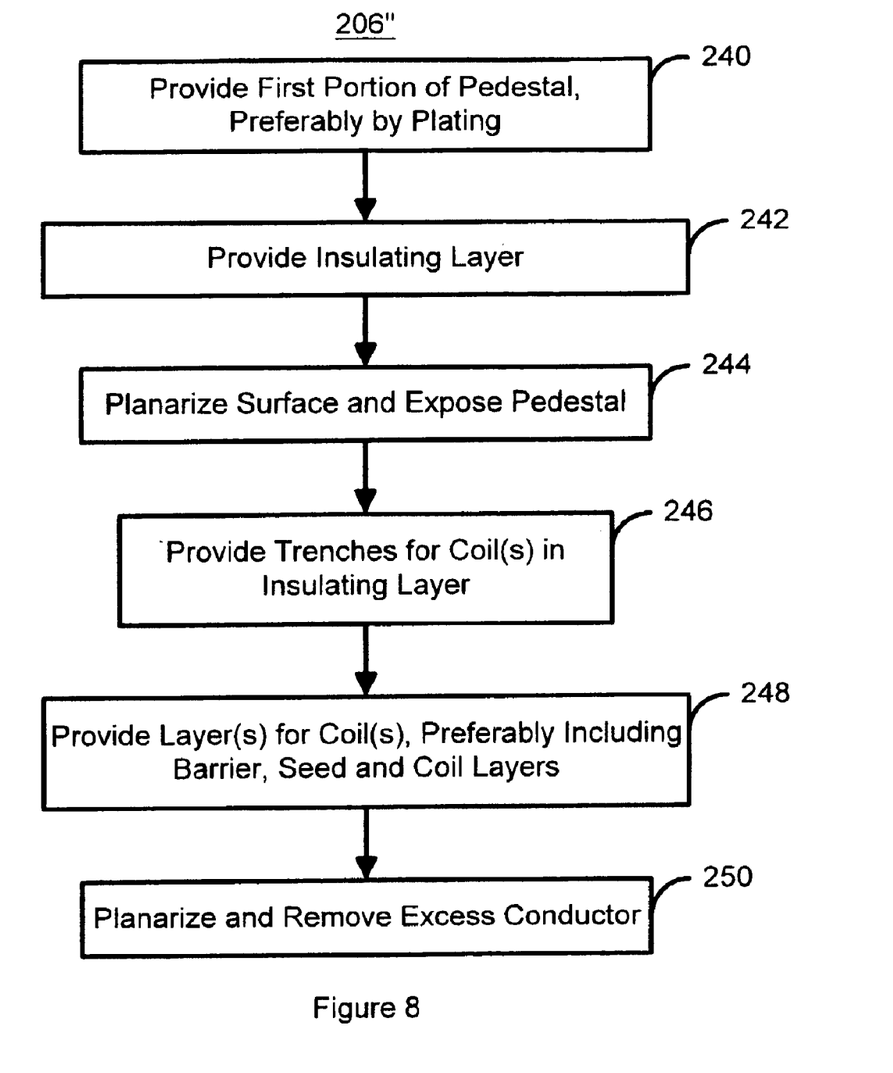
FIG. 8 is a more detailed flow chart of a second embodiment of a method in accordance with the present invention for providing the coil for a head in accordance with the present invention.

FIG. 8 is a more detailed flow chart of a second embodiment of a method 206" in accordance with the present invention for providing the coil 150' for a head 100' in accordance with the present invention. The method 206" is preferably used for performing the step 206 in the method 200 when the head 100' is being fabricated. Thus, the method 206" is used for providing the coil 150' when a damascene process is used to provide the coil 150'. The method 206" also provides the bottom portion 134' of the pedestal 132' for the P1 130'. The bottom portion 134' of the pedestal 132' is provided using negative photoresist and plating, via step 240. Step 240 includes providing photoresist having an aperture where the bottom portion 134' of the pedestal 132' is to reside and plating high moment material at the aperture. A dielectric layer is then provided, via step 242. In a preferred embodiment, step 242 includes depositing a layer of $SiO_2$. The surface is planarized and the bottom portion 134' of the pedestal 130' is exposed, via step 244. In a preferred embodiment a CMP is used to perform the planarization in step 244. The pattern for the coil 150' is etched in the dielectric layer, via step 246. Step 246 includes using photolithography to pattern trenches in the dielectric layer. The coil 150' is then provided, via step 248. In a preferred embodiment, step 248 includes providing a barrier layer, a copper seed layer and a plated copper coil layer. A planarization step is then performed, via step 250. Step 250 is preferably performed using a CMP which removes excess copper, planarizes the surface for the P2 170' and exposes the bottom portion 134' of the pedestal 132'. The remainder of the method 200, starting at step 208, can be performed. Thus, the bottom portion 134' of the pedestal 134' is exposed so that the hot seed material of the top portion 136' of the pedestal 132' can be formed. In addition, the P2 170' that is substantially flat can be formed.

Figure 9:
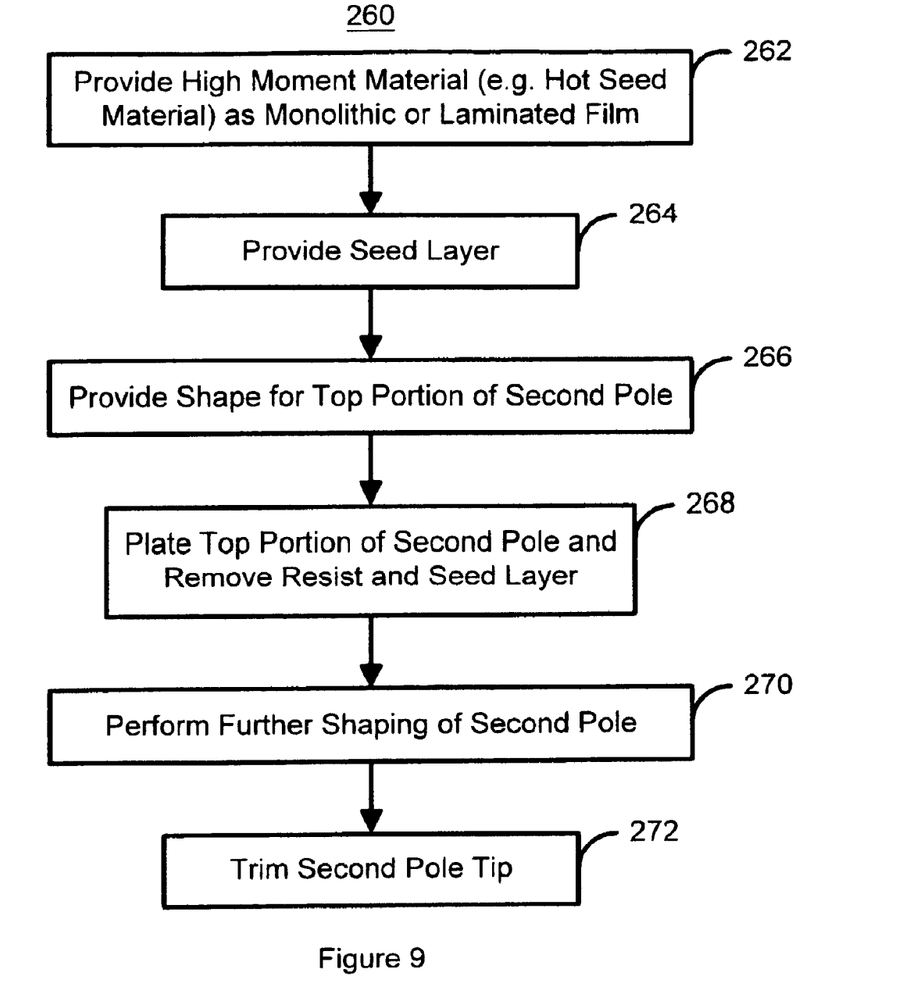
FIG. 9 is a flow chart of one embodiment of a method in accordance with the present invention for providing a top pole.

FIG. 9 is a flow chart of one embodiment of a method 260 in accordance with the present invention for providing the P2 170 or 170'. A high moment material is provided on the thin insulating layer 162/162' via step 262. The high moment material provided in step 262 may be monolithic or laminated. A laminated material has alternating layers, typically two, that are repeated. For example, a soft lower moment material such as NiFe may be alternated with a higher moment material. Similarly, an amorphous magnetic alloy which is a soft magnetic material, such as cobalt-zirconium-tantalum, cobalt-zirconium-chromium or cobalt-zirconium-niobium, could be alternated with a higher moment material. Preferably, the high moment to low moment material are provided in a nine to one ratio. For example, four hundred fifty Angstroms of the high moment material and fifty Angstroms of the low moment material (e.g. NiFe or the amorphous alloy) may be provided. As a result, the P2 170/170' would have a high moment, but would also be magnetically soft. Similarly, a dielectric layer could be alternated with a high moment magnetic material, preferably in a one to nine ratio. As a result, eddy currents in the P2 170/170' could be reduced. Thus step 262 forms the bottom portion 172/172' of the P2 170/170' can be formed.

A seed layer, for example, of NiFe or CoNiFe can optionally be provided, via step 264. The seed layer is used to aid in the formation of the electroplated portion 174/174' of the P2 170/170'. The top portion 174/174' of the P2 170/170' is shaped using photolithography, via step 266. Step 266 includes forming an aperture in photoresist over the region in which the top portion 174/174' of the P2 170 is to be formed. The top portion 174/174' of the P2 170/170' is plated and the photoresist is removed, via step 268. Also in step 268 the seed layer provided in step 264 may be milled. The P2 170/170' is generally shaped, via step 270. Step 270 includes using a wet etch to remove the plated material and performing extensive ion milling to remove the high moment material(s) and the NiFe seed layer. The pole tip is then trimmed, via step 272. Step 272 includes providing a photoresist mask for the pole tip and using ion milling to trim the P2 170/170' to the desired geometry. If a notch structure is used in the pedestal 132/132', then the write gap 140/140' may be removed and the notch (not shown) formed in the pedestal 132/132'.

Thus, using the methods 200, 260, 206' and/or 206", a head 100 and/or 100' can be provided. As a result, a head 100 and/or 100' having a narrow track width, improved side erasure, improved overwrite, a shorter yoke length and less pole tip protrusion.

A method and system has been disclosed for providing a recording head suitable for use at higher recording densities. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A recording head comprising:
    a first pole having a pedestal, the pedestal having a first portion and a second portion, the first portion including a high moment electroplated material, the second portion including a hot seed layer, the hot seed layer including a high moment sputtered material, the first portion of the pedestal having a first throat height perpendicular to an air-bearing surface of the recording head, the second portion of the pedestal having a second throat height perpendicular to the air-bearing surface, the second throat height being less than the first throat height;
    a second pole,
    a write gap separating the first pole from the second pole, the second portion of the first pole being adjacent to the write gap; and
    at least one coil having a plurality of turns, the at least one coil being between the first pole and the second pole.

2. The recording head of claim 1 wherein the first portion of the pedestal has a first thickness and the second portion of the pedestal has a second thickness less than the first thickness.

3. The recording head of claim 1 wherein the second pole is substantially flat.

4. The recording head of claim 3 wherein a top edge of the pedestal is higher than a top of the at least one coil.

5. The recording head of claim 1 wherein the second portion of the pedestal is laminated.

6. The recording head of claim 5 wherein the second portion of the head includes at least one low moment layer alternated with at least one high moment layer.

7. The recording head of claim 5 wherein the low moment layer includes an amorphous magnetic alloy.

8. The recording head of claim 5 wherein the second portion of the head includes at least one high moment layer alternated with at least one dielectric layer.

9. The recording head of claim 5 wherein the second portion of the head includes at least one high moment layer alternated a soft magnetic material.

10. The recording head of claim 9 wherein the soft magnetic material is NiFe.

11. A method for providing a recording head comprising the steps of:

(a) providing a first pole having a pedestal, the pedestal having a first portion and a second portion, the first portion including a high moment electroplated material, the second portion including a hot seed layer, the hot seed layer including a high moment sputtered material, the first portion of the pedestal having a first throat height perpendicular to an air-bearing surface of the recording head the second portion of the pedestal having a second throat height perpendicular to the air-bearing surface, the second throat height being less than the first throat height;
    (b) providing at least one coil having a plurality of turns;
    (c) providing a write gap above the pedestal of the first pole, the second portion of the first pole being adjacent to the write gap;
    (d) providing a second pole, the write gap separating the first pole from the second pole, the at least one coil being between the first pole and the second pole.

12. The method of claim 11 wherein the step of providing the first pole (a) further includes the steps of:
    (a1) providing the first portion of the pedestal with a first thickness; and
    (a2) providing the second portion of the pedestal with a second thickness less than the first thickness.

13. The method of claim 11 wherein the second pole is substantially flat.

14. The method of claim 11 wherein the step of providing the at least one coil (b) further includes the step of:
    (b1) providing the coil using a damascene process.

15. The method of claim 11 wherein the step of providing the at least one coil
    (b) further includes the step of:
    (b1) depositing the at least one coil;
    (b2) providing a layer of photoresist on the at least one coil;
    (b3) removing a portion of the layer of photoresist;
    (b4) providing an insulating layer on a remaining portion of the layer of photoresist; and
    (b5) planarizing the insulating layer.

16. The method of claim 11 wherein a top edge of the pedestal is higher than a top of the at least one coil.

17. The method of claim 11 wherein the second portion of the pedestal is laminated.

18. The method of claim 17 wherein the second portion of the head includes at least one low moment layer alternated with at least one high moment layer.

19. The method head of claim 18 wherein the low moment layer is an amorphous magnetic alloy.

20. The method of claim 17 wherein the second portion of the head includes at least one high moment layer alternated with at least one dielectric layer.

21. The method of claim 17 wherein the second portion of the head includes at least one high moment layer alternated a soft magnetic material.

22. The method of claim 20 wherein the soft magnetic material is NiFe.

23. The recording head of claim 1 wherein the hot seed layer includes at least one of CoFeN and FeXN, where X includes at least one of Rh, Al, Ta, Zr, and Ti.

24. The method of claim 11 wherein the hot seed layer includes at least one of CoFeN and FeXN, where X includes at least one of Rh, Al, Ta, Zr, and Ti.

* * * * *